(12) United States Patent
Brewington (10) Patent No.: US 8,717,387 B1
(45) Date of Patent: May 6, 2014

(54) CORRECTION OF MISALIGNED MAP DATA FROM DIFFERENT SOURCES

(75) Inventor: Brian Edmond Brewington, Fort Collins, CO (US)

(73) Assignee: Google Inc., Mountain View, CA (US)

( * ) Notice: Subject to any disclaimer, the term of this patent is extended or adjusted under 35 U.S.C. 154(b) by 126 days.

(21) Appl. No.: 13/079,314

(22) Filed: Apr. 4, 2011

(51) Int. Cl.
*G09G 5/00* (2006.01)

(52) U.S. Cl.
USPC .......................... 345/630; 345/629; 345/619

(58) Field of Classification Search
USPC .................... 345/319–343, 619–643
See application file for complete search history.

(56) References Cited

U.S. PATENT DOCUMENTS

| | | | | |
|---|---|---|---|---|
| 6,075,905 | A * | 6/2000 | Herman et al. | 382/284 |
| 6,694,064 | B1 * | 2/2004 | Benkelman | 382/284 |
| 7,127,126 | B2 * | 10/2006 | Sakai et al. | 345/630 |
| 7,646,932 | B1 * | 1/2010 | Peterson | 382/284 |
| 7,660,441 | B2 | 2/2010 | Chen et al. | |
| 7,869,667 | B1 * | 1/2011 | Wu | 382/307 |
| 2006/0041375 | A1 * | 2/2006 | Witmer et al. | 701/208 |
| 2010/0013673 | A1 * | 1/2010 | Blais | 340/946 |
| 2010/0020097 | A1 * | 1/2010 | Mai et al. | 345/629 |
| 2010/0118053 | A1 * | 5/2010 | Karp et al. | 345/630 |

* cited by examiner

*Primary Examiner* — James A Thompson
*Assistant Examiner* — Nicole Gillespie
(74) *Attorney, Agent, or Firm* — Lerner, David, Littenberg, Krumholz & Mentlik, LLP (57) ABSTRACT

Misaligned map data received from different sources is corrected to generate a map that includes aligned features. Each data source is associated with a reliability value that identifies the likelihood that the map data received from the corresponding source is aligned with a particular map location. A corrected version of the map data is generated based on the reliability values of the data sources. Generally, map data from unreliable sources is adjusted toward map data from more reliable sources until the map data from the different sources is aligned.

29 Claims, 7 Drawing Sheets

CORRECTION OF MISALIGNED MAP DATA FROM DIFFERENT SOURCES

BACKGROUND OF THE INVENTION

Various network-based search applications allow a user to enter search terms and receive a list of search results. Such applications commonly use ranking algorithms to ensure that the search results are relevant to the user's query. For example, some systems rank such results based on reliability and safety of the search result or location of the user and search result. These services may also provide business listings in response to a particular search query.

The business listing search results, or data identifying a business, its contact information, web site address, and other associated content, may be displayed on a map such that a user may identify which businesses are located within a particular area. The map may be constructed using data that identifies roads, buildings, points of interest and natural features such as waterways and wooded areas. The data for constructing the map may be provided from different sources. For example, road data may be accessed from one particular source and building data may be accessed from a different source. The different sources of the map data may result in a misalignment between the data. Accordingly, when the map is constructed, a building may incorrectly appear on the map to be in the middle of a road.

BRIEF SUMMARY OF THE INVENTION

Aspects of the invention relate generally to correcting misaligned map data received from different sources. In the event that map data received from at least two sources does not substantially align with the same map location, a reliability value associated with each map data source is identified. The reliability value identifies a likelihood that the map data received from the source aligns with the corresponding map location. An initial version of the map may be generated using map data from the sources. Since the data from at least two of the sources does not align at the same map location, the initial version of the map includes misaligned data. A final version of the map data may be generated based on the reliability values of the data sources such that the map data is adjusted to align with the corresponding map location.

In the event that map data is received from only two sources and one of the sources is significantly more reliable than the other source, the final version of the map is generated with the less reliable data being adjusted to be aligned with the more accurate data. In the event that map data is received from only two sources and each source has substantially the same reliability value, the final version of the map is generated with the data from each source being adjusted toward each other until the data is aligned. In the event that data is received from three or more sources and at least two of the sources have different reliability values, a new reliability value may be determined for the data sources based on a statistical average. The new reliability value is used to generate the final version of the map by adjusting the data from each source toward each other. In this case, data received from the source having the highest reliability value deviates (if at all) from its original position less than data received from the source having the lowest reliability value deviates from its original position until the data the at least three sources is aligned.

In one aspect, a computer-implemented method comprises receiving first map data provided by a first source associated with a first reliability value and receiving second map data provided by a second source associated with a second reliability value. The first map data and the second map data each identify geographical features for display on a map. The first map data corresponds to a same location on the map as the second map data, and the first map data is misaligned with respect to the second map data. A processor is used to align the first map data and the second map data based on the first reliability value and the second reliability value by adjusting at least one of the first map data and the second map data. The aligned first and second map data is provided for presentation to a user.

In another aspect, a computer-implemented method comprises accessing first map data supplied by a first source associated with a first reliability value, accessing second map data supplied by a second source associated with a second reliability value, and accessing third map data supplied by a third source associated with a third reliability value. The first map data, the second map data and the third map data each identify geographical features for display on a map and each correspond to a same location on the map. At least one of the first map data, the second map data and the third map data is misaligned with respect to the other of the first map data, the second map data and the third map data. A processor is used to align the first map data, the second map data and the third map data based on the first reliability value, the second reliability value and the third reliability value by adjusting at least one of the first map data, the second map data and the third map data. The aligned first, second and third map data is provided for presentation to a user.

In another aspect, a computer-implemented method corrects misalignment of map data received from different sources. The method includes: accessing first map data provided by a first source associated with a first reliability value that identifies a likelihood that the first map data is aligned with a map location, and accessing second map data provided by a second source associated with a second reliability value. The second map data corresponds to the same map location as the first map data, and the second reliability value identifies a likelihood that the second map data is aligned with the map location. The first map data and the second map data each identify geographical features for display on a map. The first map data is misaligned with respect to the second map data. Using a processor, the first map data and the second map data are aligned based on the first reliability value and the second reliability value by adjusting at least one of the first map data and the second map data. The aligned first and second map data are provided for presentation to a user.

DETAILED DESCRIPTION

Map data that is received from at least two different sources may not substantially correspond to the same map location.

The result is that a map is generated with the data misaligned at the location. In order to correct the misalignment, a reliability value associated with each map data source is identified. The reliability value identifies a likelihood that the map data received from the corresponding source aligns with the map location. A corrected version of the map data is generated based on the reliability values of the data sources. Generally, map data from an unreliable source is adjusted toward map data from a reliable source until the map data from the different sources is aligned.

Figure 1:
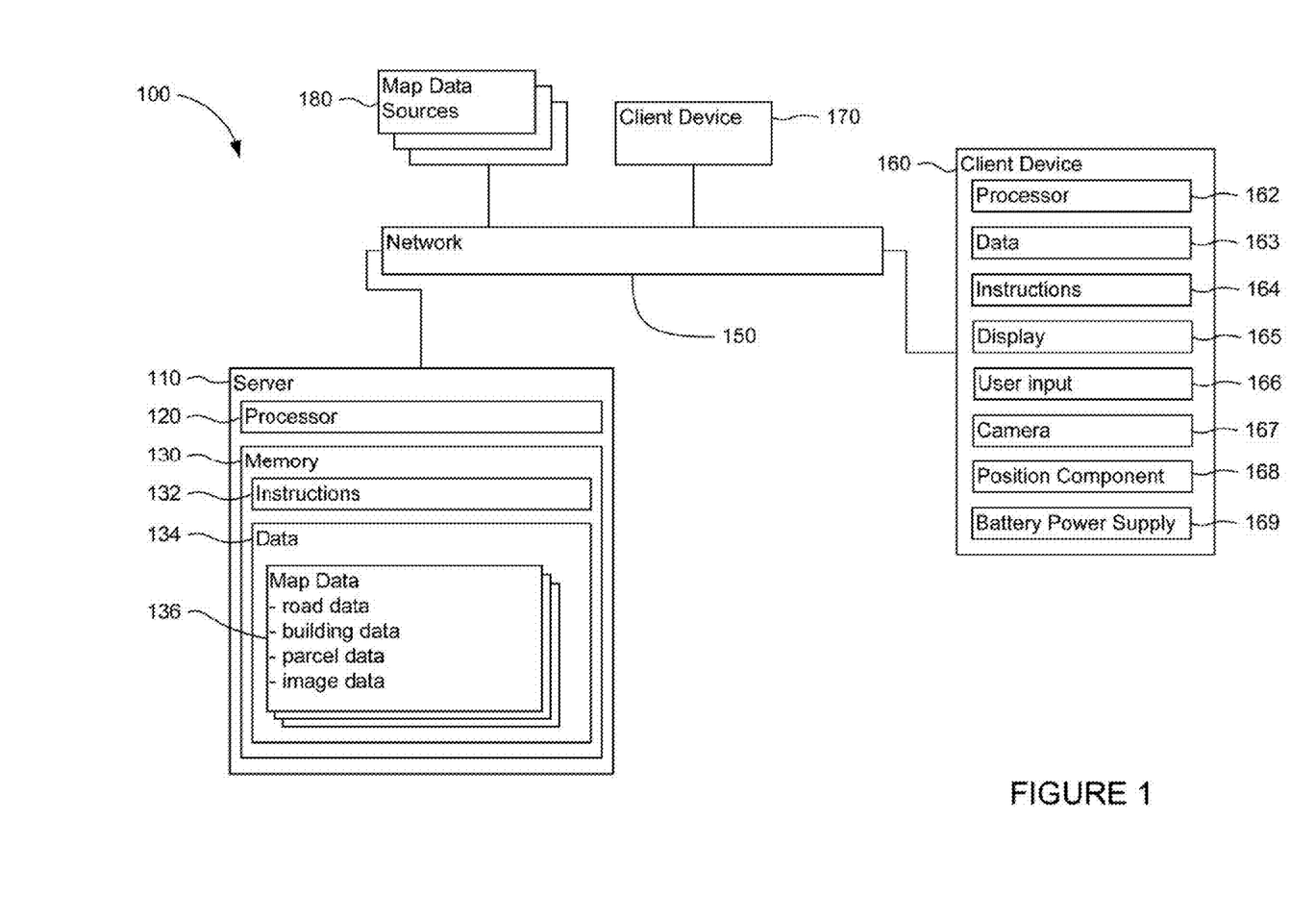
FIG. 1 is a functional diagram of a system in accordance with an aspect of the invention.
Figure 2:
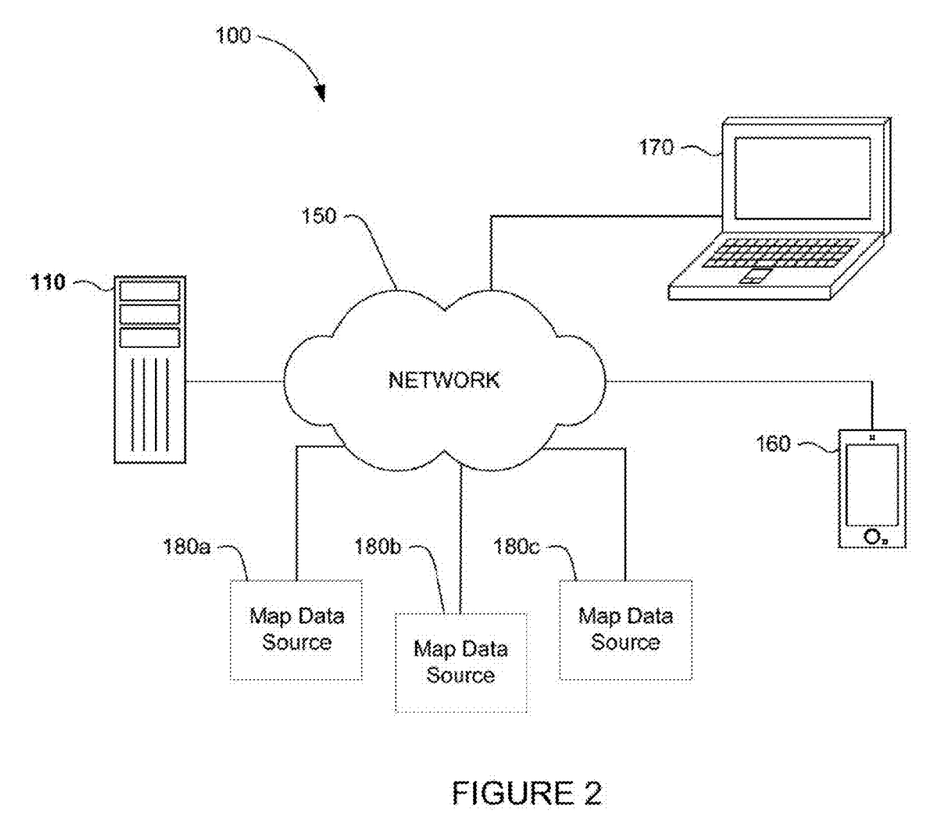
FIG. 2 is a pictorial diagram of the system of FIG. 1.

As shown in FIGS. 1 and 2, a system 100 in accordance with one aspect of the invention includes a computer 110 containing a processor 120, memory 130 and other components typically present in general purpose computers.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, a computer or a memory will be understood to include references to a collection of processors or computers or memories that may or may not operate in parallel.

The computer 110 may be at one node of a network 150 and capable of directly and indirectly receiving data from other nodes of the network. For example, computer 110 may comprise a web server that is capable of receiving data from client devices 160 and 170 via network 150 such that server 110 uses network 150 to transmit information to a user for presentation on display 165 of client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 150, and intervening nodes between server 110 and client devices 160, 170, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1 and 2, it should be appreciated that a typical system can include a large number of connected computers.

Each client device may be configured similarly to the server 110, with a processor, memory and instructions as described above. Each client device 160 or 170 may be a personal computer intended for use by a person, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), and user input 166 (e.g., a mouse, keyboard, touch-screen or microphone). The client device may also include a camera 167, geographical position component 168, accelerometer, speakers, a network interface device, a battery power supply 169 or other power source, and all of the components used for connecting these elements to one another.

The geographical position component 168 may be used to determine the geographic location and orientation of the client device. For example, client device 160 may include a GPS receiver to determine the device's latitude, longitude and altitude. Thus, as the client device 160 changes locations, for example by being physically moved, the GPS receiver may determine a new current location. The position component 168 may also comprise software for determining the position of the device based on other signals received at the client device 160, such as signals received at a cellular phone's antennas from one or more cellular phone towers if the client device 160 is a cellular phone.

Although the client devices 160 and 170 may each comprise a full-sized personal computer, they may alternatively comprise mobile devices capable of wirelessly exchanging data, including position information derived from position component 168, with a server over a network such as the Internet. By way of example only, client device 160 may be a wireless-enabled PDA, a cellular phone, a netbook or a tablet PC capable of obtaining information via the Internet or other network. The user may input information using a small keyboard, a keypad or a touch screen.

Data 134 of server 110 may include map data 136. The map data 136 includes data that identifies geographical features that may be displayed on a map. The map data 136 may be obtained from a variety of different data sources 180 that are also linked to the network 150. The map data 136 may identify geographic features on a map using data collected from different map data sources 180a, 180b, 180c (see FIG. 2). Examples of the map data may include road data, building data, parcel data, image data, business locations (e.g., markers at business entrances), waterways, terrain data (e.g., elevation), railways, two-dimensional or three-dimensional models of elevated roadway structures (e.g., overpasses), and landmark points of interest.

In addition to the operations described below and illustrated in the figures, various operations in accordance with aspects of the invention will now be described. It should also be understood that the following operations do not have to be performed in the precise order described below. Rather, various steps can be handled in a different order or simultaneously, and may include additional or fewer operations.

Figure 3:
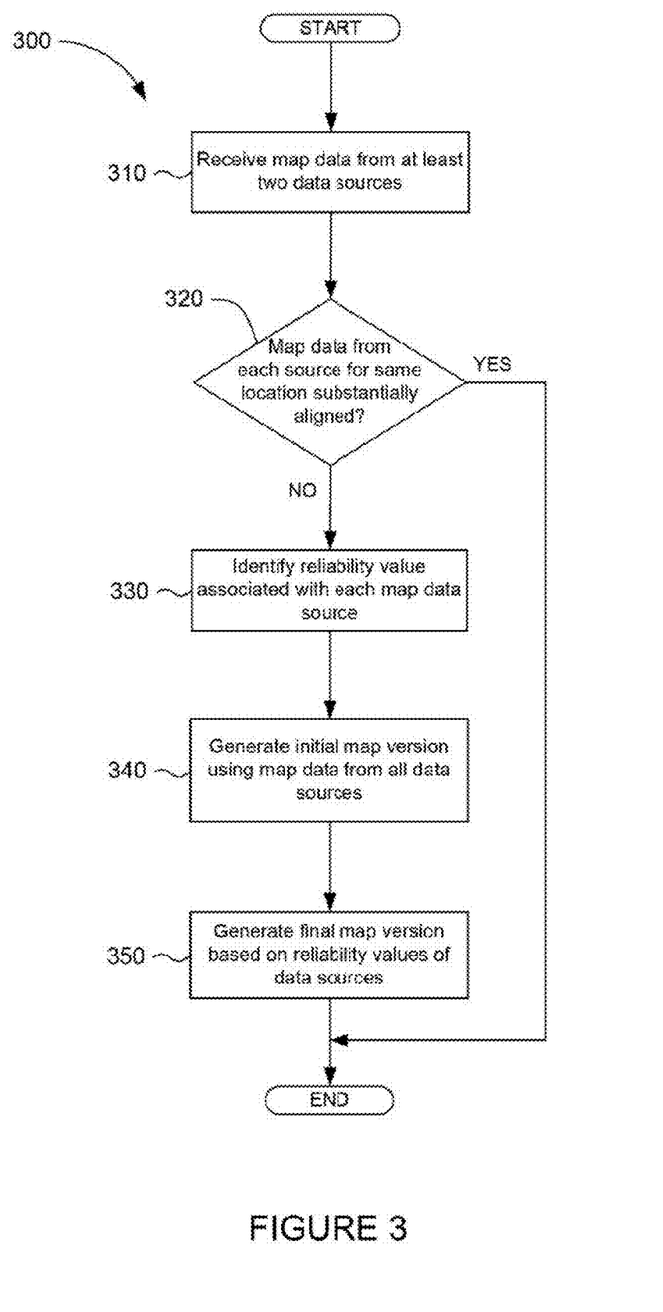
FIG. 3 is an exemplary flow diagram in accordance with aspects of the invention.

FIG. 3 demonstrates a process 300 of correcting misaligned map data collected from different sources. The process 300 begins when map data is received from at least two data sources (step 310). One example of a data source includes a database of satellite imagery. A satellite may be used to trace individual physical structures such as buildings and other man-made structures. Another example of a data source includes a database of road data that may be provided by a surveying entity that has recorded the placement and location of roadways in a particular area. Parcel data may provide another source of map data. Parcel data identifies real estate parcels in accordance with the legal boundaries of the corresponding property address. In one other example, image data collected at a particular location may provide a street level view of the location on a map.

A determination is made whether the map data received from each source is substantially aligned (step 320). The map data is determined to be substantially aligned when data for the same map location received from different sources does not overlap such that visible gaps are formed between the data received from the different sources. In other words, the map that is generated from the data from the different sources does not include any misaligned, overlapping features. If the map data received from each source is substantially aligned, processing terminates. In this case, no correction is necessary because the map data corresponding to the same location and received from different sources would result in generation of a map that includes visibly aligned features.

The visible gap that may be formed between data received from different sources is useful to determine misalignment between road data and building data, or between waterway data and building data. For other types of data, a visible gap is not useful for determining misalignment. For example, a gap is not desired when aligning a business entrance with a building. Rather, the business entrance should appear on an envelope of the building. In another example, when aligning data of the same type (e.g., the same building data from two different sources), perfect overlap is desired. In one illustrative example, building and road data may be provided from a first source. A second source of building data may provide additional data that is less reliably positioned than the first source. Alignment may be scored in one of two ways: 1) a gap between second source buildings and first source roads; and 2) alignment between second source buildings and first source buildings. In general, one could specify, for any two types of map data, whether separation or overlap is desired.

The map data is determined to be not substantially aligned when data for the same map location received from different sources results in a map that is generated with visibly misaligned features. A misalignment may be due to a deviation between map data that is greater than a predetermined threshold. In one embodiment, the threshold is based on a deviation percentage. For example, in the event that map data from one source deviates from corresponding map data from a different source by more than 5%, a determination is made that a misalignment exists between the map data. The percentage may be based on an amount of displacement between the different sources relative to a size or scale of an object depicted by the data. In another embodiment, the threshold is based on a distance. For example, in the event that the map is displayed with an overlap between the misaligned data resulting in a gap of more than one meter, a determination is made that a misalignment exists between the map data.

The above-described metrics for determining misalignment apply to the overlap of data from different sources. When misalignment is determined based on separation between data received from different sources, the separation of data is balanced. For example, in the event that building data and road data is misaligned, the building-road separation is balanced so that the roads are, on average, displayed at an equal distance from buildings on both sides. Specifically, the road network may be provided from a fixed/reliable source such that the building data is moved relative to the road data. For all buildings, the average distance from the nearest road is determined. Accordingly, for any road, there are two piecewise linear functions (e.g., one for each side of the road). A "misalignment score" is generated for a particular building vs. road alignment by taking an average distance-from-road on both sides where the function is defined (e.g., where there is a building). The score for a given road segment is the difference in these values. The score for a road network is the sum of these scores for all segments. Various weightings may be applied to the sum. For example, more weight may be given for a greater number of buildings and/or greater total "frontage".

In the event that map data corresponding to the same map location and received from the different sources is not substantially aligned because the deviation between the map data exceeds a threshold, processing proceeds to step 330.

A reliability value associated with each map data source is identified (step 330). The reliability value identifies a likelihood that map data received from the corresponding data source is aligned with a corresponding map location. For example, a satellite that traces physical structures may be deemed a reliable data source if the data was recently collected (e.g., within the last three months). Similarly, a camera that collects image data at street level may be deemed to be an unreliable source of data because the data is not commonly provided in the context of a map view. In another example, a database of road data may be considered reliable if the database is frequently updated (e.g., at least every six months) and may be considered unreliable if the data is stale (e.g., not updated in at least two years). Parcel data may also be considered as reliable since this information is commonly based on recorded property boundaries which are commonly updated when a boundary change is recorded or when ownership of real property is transferred. Reliability may also be based on specific physical device characteristics. For example, low resolution imagery from a satellite is considered to be less reliable than high resolution satellite imagery.

A data provider may also claim that refreshed data is more reliable than a previous version of the data.

In some embodiments, a high reliability value corresponds to a reliable map data source, a low reliability value corresponds to an unreliable data source, and a reliability value that is not high or low corresponds to a data source that is considered neither reliable nor unreliable. For example, a reliability value may lie in a range between zero and one such that a map data source having a reliability value of one is considered to be extremely reliable, a map data source having a zero reliability value is considered to be not at all reliable, and a map data source having a reliability value of 0.5 is considered to be neither reliable or unreliable. As one having ordinary skill in the art would appreciate, other ranges or percentages may be employed.

In one illustrative example, two different data sources provide map data: one is from a satellite that traced the outline and position of buildings and the other is from a source that provides road data that is updated at least annually. In this example, the satellite data source may correspond to a reliability value of 0.9 and the road data source may correspond to a reliability value of 0.4. In another example, map data may also be received from a third data source, such as a database of images collected at street level. The image data source may correspond to a reliability value of 0.1.

An initial map version is generated using the map data received from available data sources (step 340). Since the data corresponding to the same map location received from at least two of the sources does not align, an overlap occurs between data for the same map location. Accordingly, the initial map version includes misaligned map data.

Referring to the example above, map data may be received from three different sources: a satellite data source, a road data source, and an image data source. When the data is received, a determination may be made that at least some of the sources provide data for a particular map location that is not substantially aligned with the data provided by the other sources for the same map location. Accordingly, the initial map is generated such that there is a misalignment between the data provided from the three different sources at the same map location. In other words, the road data, the building data and the image data are not aligned with each other.

A final map version is generated based on the reliability values of the data sources (step 350). The overlapping data is aligned such that the map data from the different sources no longer overlaps. In one embodiment, the map data from the data source(s) that have the lowest reliability values are adjusted to be aligned with the map data from the data source(s) having the highest reliability values.

In another embodiment, each reliability value of the data sources may be aggregated based on a statistically weighted mean value to identify a map location where the overlapping map data should be aligned. Typically, a mean value may be located somewhere between the three map locations. However, the mean value is varied based on the reliability values of the different data sources. In the example above, the satellite data source corresponds to a reliability value of 0.9, the road data source corresponds to a reliability value of 0.4, and the image data source corresponds to a reliability value of 0.1. Here, the mean value is closer to the satellite data and further away from both the road data and the image data. Depending on the configuration of the different data at the same map location, the mean value may also be closer to the road data than the image data due to the less reliable source that provides the image data.

Once the map data from the different sources is properly aligned, the final map version may be displayed without any visible overlap between the map data received from different sources. Processing then terminates.

Figure 4:
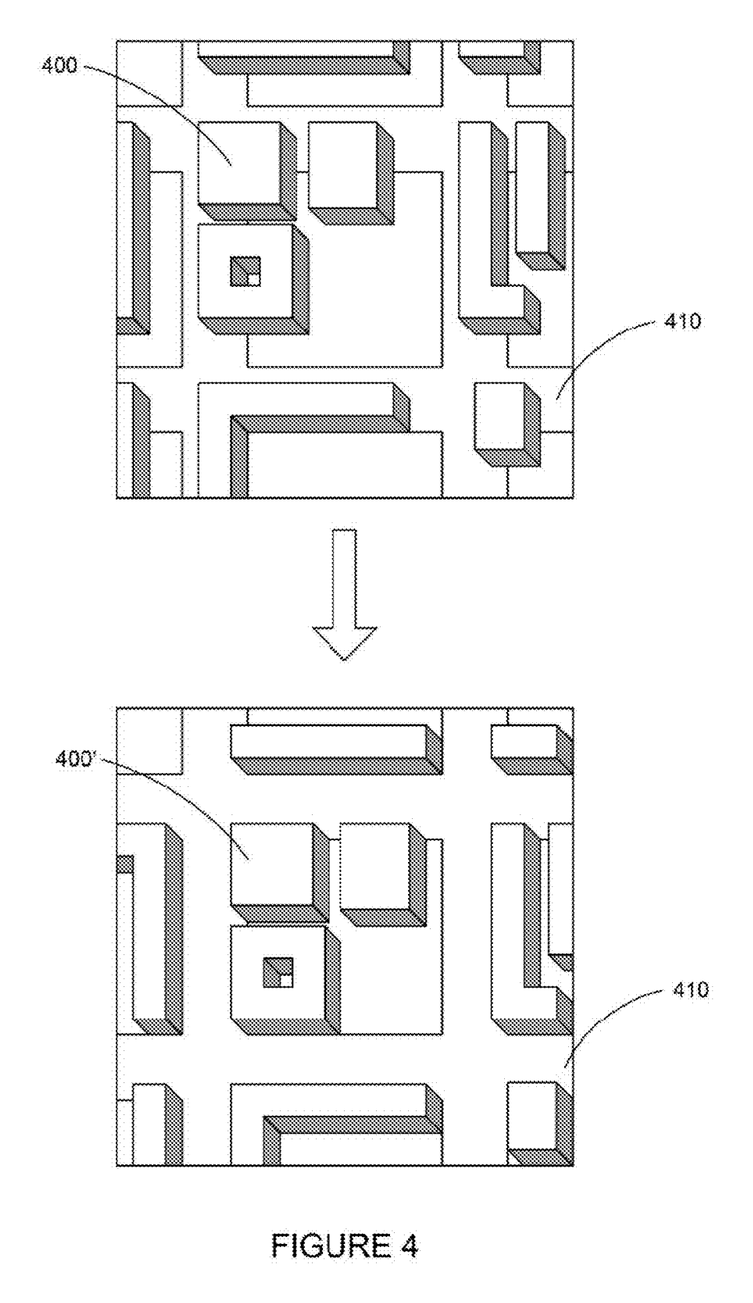
FIG. 4 is an exemplary screen shot in accordance with aspects of the invention.
Figure 5:
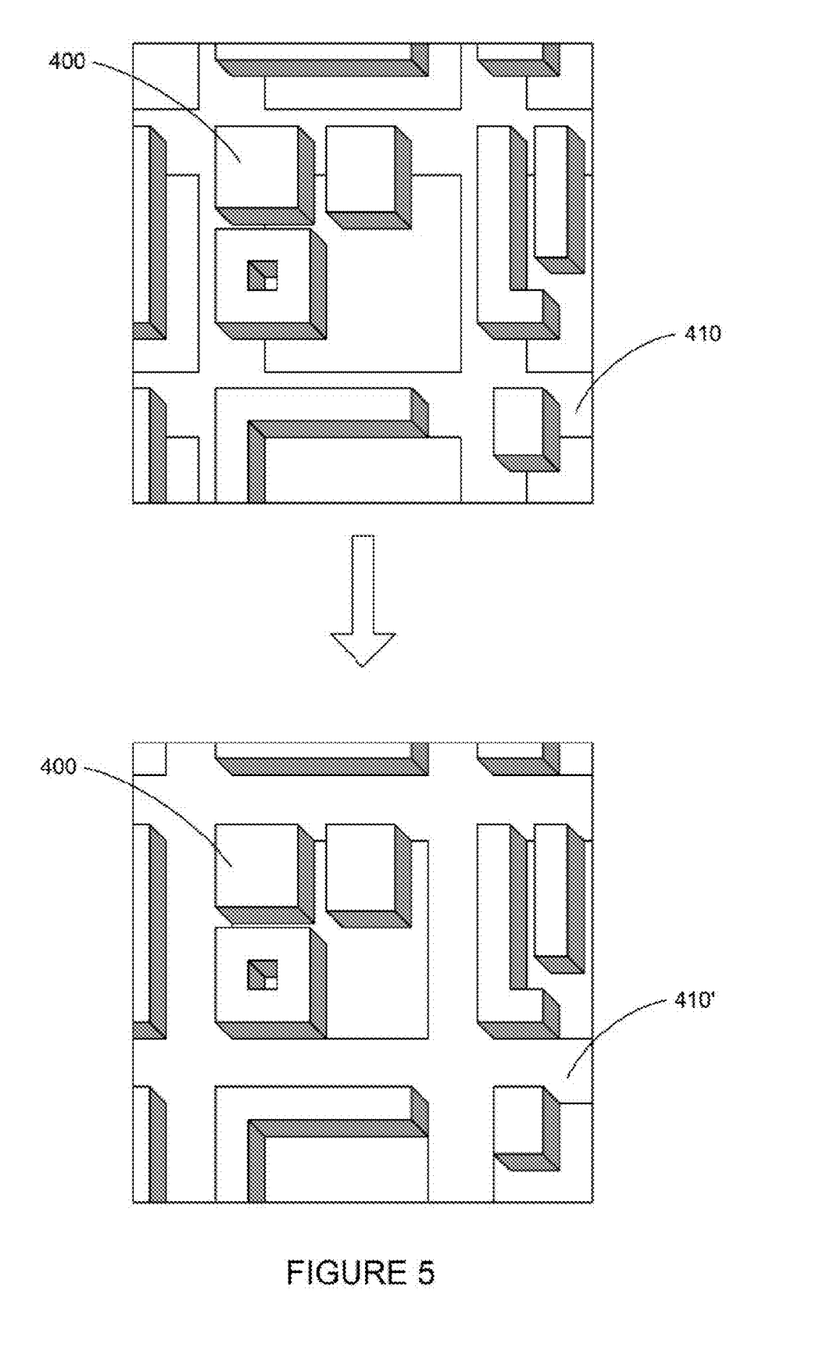
FIG. 5 is another exemplary screen shot in accordance with aspects of the invention.
Figure 6:
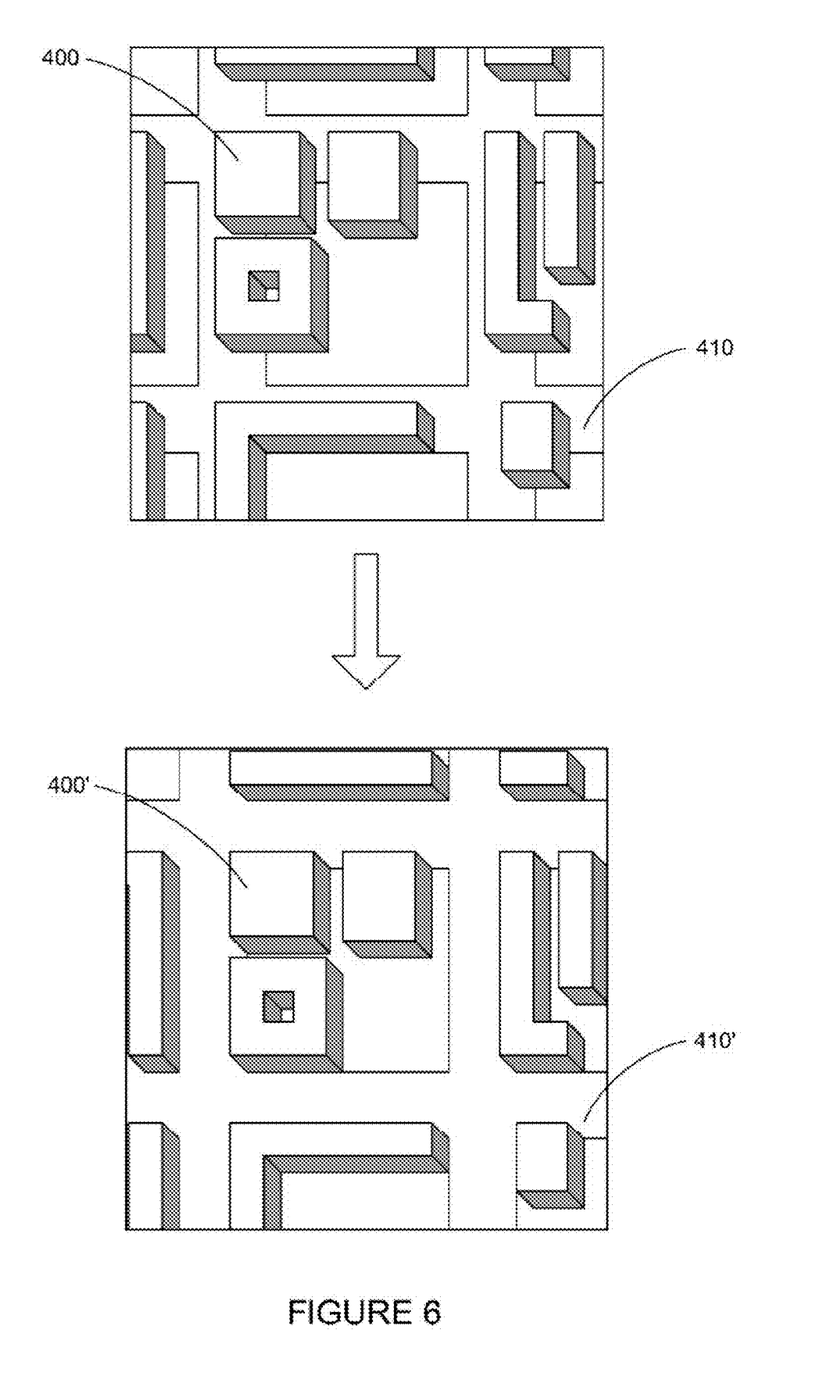
FIG. 6 is a further exemplary screen shot in accordance with aspects of the invention.

Referring to FIGS. 4, 5 and 6, a map is shown that includes map data retrieved from at least two different sources. At least one source provides building data and at least another source provides road data. As shown in the upper portion of each figure, the map is generated with the building data 400 being misaligned with the road data 410 such that most buildings appear to be partially positioned toward a middle of a road.

With reference to FIG. 4, the process 300 is executed and a determination is made that the road data source is much more reliable than the building data source. In this case, the building data 400 (as shown in the upper portion of FIG. 4) is adjusted to become aligned with the road data 410. In other words, the road data 410 remains stationary and the building data 400 is adjusted to align with the road data 410 resulting in aligned building data 400'.

With reference to FIG. 5, the process 300 is executed and a determination is made that the building data source is much more reliable than the road data source. In this case, the road data 410 is adjusted to become aligned with the building data 400. The building data 400 remains stationary and the road data 410 is adjusted to align with the building data 400 resulting in aligned road data 410'.

With reference to FIG. 6, the process 300 is executed and a determination is made that the building data source is at about the same level of reliability as the road data source. In this case, both the road data 410 and the building data 400 are adjusted toward each other until they are aligned resulting in aligned building data 400' and aligned road data 410'.

Figure 7:
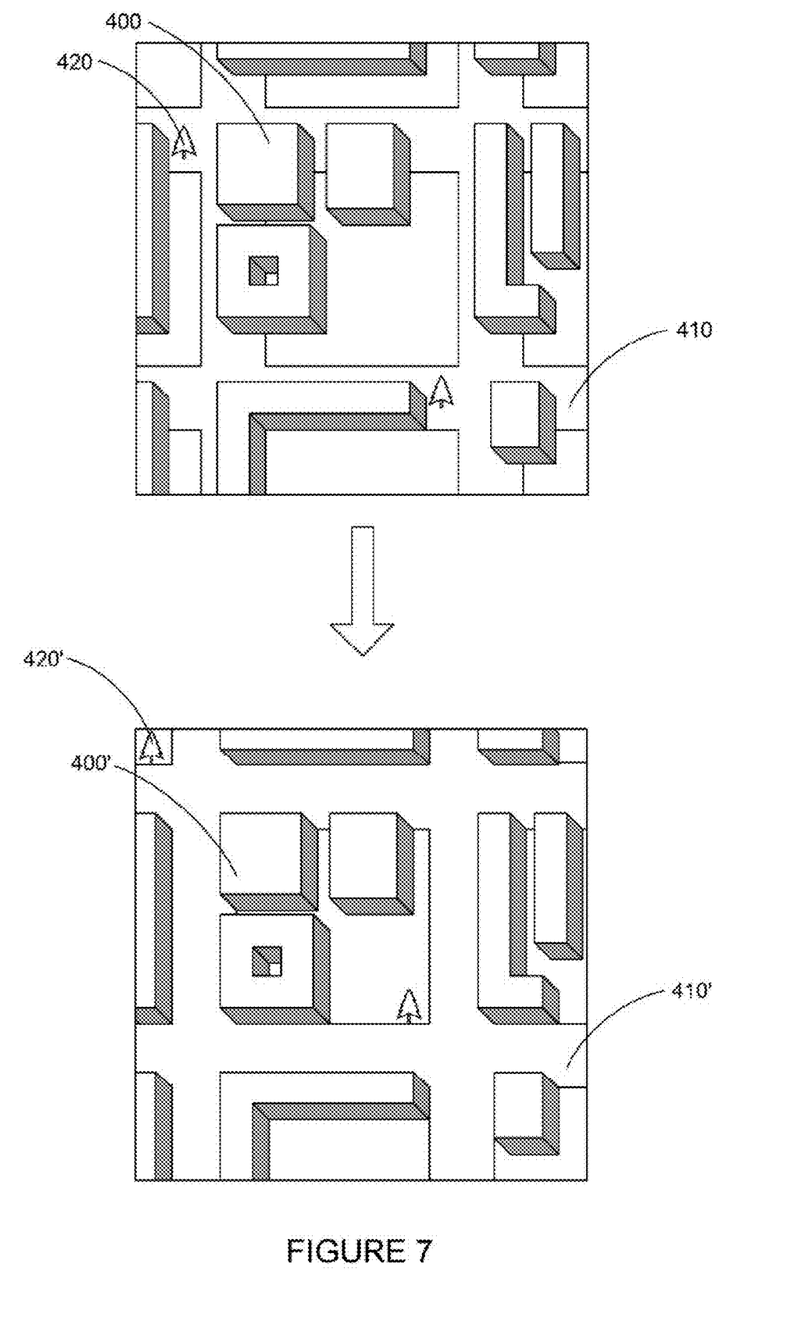
FIG. 7 is another exemplary screen shot in accordance with aspects of the invention.

Referring to FIG. 7, a map is shown that includes data retrieved from at least three different sources. At least one source provides building data, at least another source provides road data, and at least one other source provides image data. As shown in the upper portion of the figure, the map is generated with the building data 400 being misaligned with both the road data 410 and the image data 420 such that the buildings and images appear to be positioned toward the middle of the road. In this embodiment, three different data sources together provide the data necessary to construct a map. However, the data may be provided from a larger number of data sources and still lie within the invention as recited in the claims.

In accordance with embodiments of the invention, a determination is made that the building data source, the road data source and the image data source are all associated with different reliability values. In one illustrative example, the building data source may be associated with a reliability value of 0.9, the road data source may be associated with a reliability value of 0.4, and the image data source may be associated with a reliability value of 0.1. In one illustrative example, the road data 410 may be offset from the building data 400 by five meters, and the image data 420 may be offset from the building data 400 by ten meters. In this case, both the road data 410 and the image data 420 are adjusted toward the building data 400. The image data 420 is adjusted more than the road data 410 due to a likelihood that the image data 420 is misaligned with the corresponding map location by a greater amount than the road data 410 (e.g., based on the reliability value of the image data source and based on the larger offset distance between the image data and the building data). For example, the road data 410 may be adjusted toward the building data 400 by an amount corresponding to the 5 meter offset from the building data 400, and the image data 420 may be adjusted toward the building data 400 by an amount corresponding to the 10 meter offset from the building data 400. In this case, the image data 420 is adjusted more than the road data 410 due to the image data 420 being misaligned with the corresponding map location by a greater amount than the road data 410. In some embodiments, the building data 400 may be adjusted slightly toward the road data 410 but not as much as the road data 410 is adjusted toward the building data 400 due to the building data source having a higher reliability value than the road data source. Once the map data from the three sources is aligned, the map may be displayed with adjusted building data 400', adjusted road data 410' and adjusted image data 420'.

As described above, misaligned map data received from different sources is adjusted based on the reliability of the corresponding source to generate a map with aligned data. In the event that map data is received from only two sources and one of the sources is significantly more reliable than the other source, the final version of the map is generated with the less reliable data being adjusted to be aligned with the more accurate data. In the event that map data is received from only two sources and each source has substantially the same level of reliability, the final version of the map is generated with the data from each source being adjusted toward each other until the data is aligned. In the event that data is received from three or more sources and at least two of the sources have a different level of reliability, a final version of the map may be generated by adjusting the data from each source toward each other. In this case, data received from the source having the highest level of reliability deviates from its original position (if at all) less than data received from the source having the lowest level of reliability deviates from its original position until the data from the different sources is aligned.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A computer-implemented method comprising:
receiving first map data, the first map data having been provided by a first image source, wherein the first image source is associated with a first reliability value;
receiving second map data, the second map data having been provided by a second image source, wherein the second image source is associated with a second reliability value, the first map data and the second map data identifying geographical features for display on a map, wherein the first map data corresponds to a same location on the map as the second map data, the first map data being misaligned with respect to the second map data;
comparing the first reliability value to a threshold to derive a first comparison result;
comparing the second reliability value to the threshold to derive a second comparison result;
adjusting at least one of the first map data and the second map data based on the first and second comparison results to align the first map data and the second map data; and
providing the aligned first and second map data for presentation to a user.

2. The method of claim 1, wherein the first reliability value identifies a likelihood that the first image source provides first map data that is aligned with the location on the map, and the second reliability value identifies a likelihood that the second image source provides second map data that is aligned with the map location.

3. The method of claim 1, wherein the adjusting comprises:
in the event that the first reliability value exceeds the threshold and the second reliability value does not exceed the threshold, adjusting the second map data to be aligned with the first map data,
wherein the threshold identifies whether an image source is likely to provide map data that is aligned with the map location.

4. The method of claim 3, wherein the first map data is adjusted toward the second map data, the second map data being adjusted by a larger amount than the first map data.

5. The method of claim 1, wherein the adjusting comprises:
in the event that the second reliability value exceeds the threshold and the first reliability value does not exceed the threshold, adjusting the first map data to be aligned with the second map data,
wherein the threshold identifies whether an image source is likely to provide map data that is aligned with the map location.

6. The method of claim 5, wherein the second map data is adjusted toward the first map data, the first map data being adjusted by a larger amount than the second map data.

7. The method of claim 1, wherein the adjusting comprises:
in the event that the first reliability value exceeds the threshold and the second reliability value exceeds the threshold, adjusting the first map data and the second map data to be aligned with each other,
wherein the threshold identifies whether an image source is likely to provide map data that is aligned with the map location.

8. The method of claim 7, wherein the first reliability value exceeds the threshold by a greater amount than the second reliability value exceeds the threshold, the first map data being adjusted by a lesser amount than the second map data.

9. The method of claim 1, wherein the adjusting comprises:
in the event that the first reliability value does not exceed the threshold and the second reliability value does not exceed the threshold, adjusting the first map data and the second map data to be aligned with each other,
wherein the threshold identifies whether an image source is likely to provide map data that is aligned with the map location.

10. The method of claim 9, wherein the first reliability value is less than the threshold by an amount that is greater than an amount that the second reliability value is less than the threshold, the first map data being adjusted by a larger amount than the second map data.

11. The method of claim 1, wherein the processor constructs the map by using the first map data as a first layer, using the second map data as a second layer, and overlaying the first and second layers.

12. The method of claim 1, wherein at least one of the first and second image sources is an image capturing device.

13. The method of claim 1, wherein at least one of the first and second image sources is an image storage device.

14. A computer-implemented method comprising:
accessing first map data, the first map data being supplied by a first image source, wherein the first image source is associated with a first reliability value;
accessing second map data, the second map data being supplied by a second image source, wherein the second image source is associated with a second reliability value;

accessing third map data, the third map data being supplied by a third image source, wherein the third image source is associated with a third reliability value, the first map data, the second map data and the third map data each identifying geographical features for display on a map, wherein the first map data, the second map data and the third map data each correspond to a same location on the map, at least one of the first map data, the second map data and the third map data being misaligned with respect to the other of the first map data, the second map data and the third map data;

aligning, with a processor, the first map data, the second map data and the third map data based on the first reliability value, the second reliability value and the third reliability value by adjusting at least one of the first map data, the second map data and the third map data; and providing the aligned first, second and third map data for presentation to a user.

15. The method of claim 14, wherein the first reliability value identifies a likelihood that the first map data is aligned with the location on the map, the second reliability value identifies a likelihood that the second map data is aligned with the location on the map, and the third reliability value identifies a likelihood that the third map data is aligned with the location on the map.

16. The method of claim 15, wherein the aligning comprises:
in the event that: 1) the first reliability value exceeds a threshold; 2) the second reliability value does not exceed the threshold; and 3) the third reliability value does not exceed the threshold, adjusting the second map data and the third map data toward the first map data.

17. The method of claim 16, wherein the third reliability value is less than the threshold by a greater amount than the second reliability value is less than the threshold, the third map data being adjusted by a larger amount than the second map data.

18. The method of claim 15, wherein the aligning comprises:
in the event that the first reliability value, the second reliability and the third reliability value are each greater than a threshold, adjusted the first map data, the second map data and the third map data toward each other.

19. The method of claim 15, wherein the aligning comprises:
in the event that the first reliability value, the second reliability value and the third reliability value are each less than a threshold, adjusted the first map data, the second map data and the third map data toward each other.

20. The method of claim 15, wherein the aligning comprises:
in the event that: 1) the first reliability value is greater than a threshold by a first amount; 2) the second reliability value is less than the threshold; and 3) the third reliability value is greater than the threshold by a second amount that is less than the first amount, adjusting the second map data and the third map data toward the first map data, wherein the second map data is moved by a larger amount than the third map data.

21. The method of claim 14, further comprising determining an adjustment of at least one of the first map data, the second map data, and the third map data based on a comparison among the first reliability value, the second reliability value, and the third reliability value.

22. The method of claim 14, wherein the processor constructs the map by using the first map data as a first layer, using the second map data as a second layer, using the third map data as a third layer, and overlaying the first, second and third layers.

23. The method of claim 14, wherein at least one of the first, second, and third image sources is an image capturing device.

24. The method of claim 14, wherein at least one of the first, second, and third image sources is an image storage device.

25. A computer-implemented method for correcting misalignment of map data received from different image sources, the method comprising:
accessing first map data, wherein the first map data is provided by a first image source, wherein the first image source is associated with a first reliability value, the first reliability value identifying a likelihood that the first map data is aligned with a map location;

accessing second map data, wherein the second map data is provided by a second image source, wherein the second image source is associated with a second reliability value, the second map data corresponding to the same map location as the first map data, wherein the second reliability value identifies a likelihood that the second map data is aligned with the map location, wherein the first map data and the second map data each identify geographical features for display on a map, the first map data being misaligned with respect to the second map data;

comparing the first reliability value to a threshold to derive a first difference;

comparing the second reliability value to the threshold to derive a second difference;

comparing the first difference to the second difference;

determining a first adjustment for the first map data and a second adjustment for the second map data based on the comparison between the first difference and the second difference;

aligning, with a processor, the first map data and the second map data by adjusting the first map data according to the first adjustment and adjusting the second map data according to the second adjustment; and providing the aligned first and second map data for presentation to a user.

26. The method of claim 25, wherein the aligning comprises:
in the event that the first reliability value exceeds the threshold and the second reliability value does not exceed the threshold, adjusting the second map data toward the first map data.

27. The method of claim 26, wherein the first map data is adjusted toward the second map data, the second map data being adjusted by a larger amount than the first map data.

28. The method of claim 25, wherein at least one of the first and second image sources is an image capturing device.

29. The method of claim 25, wherein at least one of the first and second image sources is an image storage device.

* * * * *

UNITED STATES PATENT AND TRADEMARK OFFICE
CERTIFICATE OF CORRECTION

PATENT NO. : 8,717,387 B1
APPLICATION NO. : 13/079314
DATED : May 6, 2014
INVENTOR(S) : Brian Edmond Brewington It is certified that error appears in the above-identified patent and that said Letters Patent is hereby corrected as shown below:

In the Claims

Column 11, line 41, after "ability" insert -- value --.
Column 11, line 48, "adjusted" should read -- adjusting --.

Signed and Sealed this
Eleventh Day of August, 2015

Michelle K. Lee
*Director of the United States Patent and Trademark Office*